(12) United States Patent
Zivkovic

(10) Patent No.: US 10,953,613 B2
(45) Date of Patent: Mar. 23, 2021

(54) CUTTING MECHANISM WITH ROTATABLE BLADES

(71) Applicant: ROLLS-ROYCE plc, London (GB)

(72) Inventor: Petar Zivkovic, Bristol (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 16/154,082

(22) Filed: Oct. 8, 2018

(65) Prior Publication Data

US 2019/0126573 A1  May 2, 2019

(30) Foreign Application Priority Data

Oct. 30, 2017 (GB) ...................................... 1717822

(51) Int. Cl.
| | |
|---|---|
| *B29C 70/00* | (2006.01) |
| *B26D 7/00* | (2006.01) |
| *B29C 70/54* | (2006.01) |
| *B26D 7/26* | (2006.01) |
| *B29C 70/38* | (2006.01) |
| *B26D 1/09* | (2006.01) |

(Continued)

(52) U.S. Cl.
CPC ............ *B29C 70/545* (2013.01); *B26D 1/015* (2013.01); *B26D 1/095* (2013.01); *B26D 7/0683* (2013.01); *B26D 7/2628* (2013.01); *B29C 70/38* (2013.01); *B29C 70/384* (2013.01); *B29C 2793/0027* (2013.01); *B29K 2063/00* (2013.01); *B29K 2307/04* (2013.01); *B29L 2031/08* (2013.01); *F05D 2230/31* (2013.01)

(58) Field of Classification Search
None
See application file for complete search history.

(56) References Cited

U.S. PATENT DOCUMENTS 3,691,888 A * 9/1972 Brandon .................. B26D 1/03
83/302
8,336,596 B2 * 12/2012 Nelson .................. B29C 70/202
156/574

(Continued)

FOREIGN PATENT DOCUMENTS

| CN | 102963010 A | 3/2013 |
| EP | 1985808 A1 | 10/2008 |

(Continued)

OTHER PUBLICATIONS

English machine translation for CN102963010A to Duan Yugang et al published Mar. 13, 2013, 3 pages. (Year: 2013).*

(Continued)

*Primary Examiner* — Linda L Gray
(74) *Attorney, Agent, or Firm* — Barnes & Thornburg LLP

(57) ABSTRACT

A cutting mechanism for a composite material lay-up head comprises a plurality of blades, each blade having a variable width, and a drive mechanism to drive the blades along an axial direction to cut a respective tow of composite material. The blades are rotatable about the axial direction between a first angular position, wherein the blades sever the respective tow along a first cutting direction transversal to a longitudinal direction of the respective tow, and a second angular position, wherein the blades sever the respective tow along a second cutting direction rotated by a rotation angle to the first cutting direction.

19 Claims, 7 Drawing Sheets

(51) Int. Cl.
*B26D 1/01* (2006.01)
*B26D 7/06* (2006.01)
B29K 63/00 (2006.01)
B29K 307/04 (2006.01)
B29L 31/08 (2006.01)

(56) References Cited

U.S. PATENT DOCUMENTS

2008/0216961 A1* 9/2008 Hamlyn ................ B26D 1/085
    156/391
2014/0260858 A1     9/2014 Johnson et al.

FOREIGN PATENT DOCUMENTS

| EP | 2969493 | 1/2016 |
|---|---|---|
| EP | 3192643 | 7/2017 |
| JP | 2011226559 A | 11/2011 |

OTHER PUBLICATIONS

Extended EP Search Report dated May 17, 2019 and issued in connection with EP Patent Appln. No. 18205908.9.
Great Britain search report dated Feb. 21, 2018, issued in GB Patent Application No. 1717822.9.
Extended EP Search Report dated May 10, 2019 and issued in connection with EP Patent Appln. No. 18198426.1.
European Office Action, dated Apr. 1, 2020 in connection with European Application No. 18198426.1, 3 pages.

\* cited by examiner

CUTTING MECHANISM WITH ROTATABLE BLADES

CROSS-REFERENCE TO RELATED APPLICATIONS

This specification is based upon and claims the benefit of priority from UK Patent Application Number 1717822.9 filed on 30 Oct. 2017, the entire contents of which are incorporated herein by reference.

BACKGROUND

Technical Field

The present disclosure relates to a cutting mechanism for severing elongate fibre composite material in composite material lay-up equipment, particularly but not exclusively to manufacture components for a turbomachine.

Description of the Related Art

Fibre composite components are frequently used for applications requiring a combination of light weight and strength, for example for components in the aerospace and other industries. Fibre composite components are manufactured from composite material including a reinforcement material (e.g. carbon fibre) and a matrix material (e.g. epoxy resin). A fibre composite component may be constructed by laying up several plies of fibre composite material to produce a fibre composite material preform for the component. The preform is essentially a series of planar layers of fibre composite material, having various orientations. The plies of fibre composite material may be joined together using through-thickness fibres. For example, tufting, stitching and Z-pinning are examples of techniques for joining the plies of fibre composite material. Manufacturing developments have allowed the lay-up process to be performed automatically.

An exemplary automatic composite manufacturing process is Automatic Fibre Placement (AFP). Briefly, in AFP, the fibre reinforcement material is applied in the form of a "tow", comprising a plurality of individual fibres, or multiple "tows". A "tow" may be a narrow width of tape slit from a wider tape. AFP is particularly suitable where fibre steering is needed, to accommodate for relatively complex shape preforms. The fibres are typically pre-impregnated with matrix material or drawn through a bath of matrix material. A course or series of "tows" is typically applied by an applicator roller at different orientations from one another to form a ply structure.

A lay-up head is typically used to dispense, apply and sever (or cut) the tows of fibre reinforcement material (whether pre-impregnated or not) at the end of the process, or at the end of a stage in the process. Depending on the shape and property of the component, the lay-up head is required to supply tows (or tapes) with different length and different mutual orientation.

In fibre composite component manufacturing tow courses are generally placed at 00, 45°, 90°, or 135° (i.e. −45°) to a reference direction. The known lay-up heads and associated cutting mechanisms can place the 0° and 90° tow courses substantially with no large gaps or overlaps between adjacent courses, which would be detrimental to mechanical properties of the composite structure. Moreover, substantially no waste of material can be achieved.

In FIG. 1 there are illustrated two courses A of 0° tows in a first layer and one course B of 90° tows in a second layer, on top of the first layer. No major gaps can be seen between the courses of the first layer, and edges of courses A and course B overlap accurately.

Even in the event that courses of 90° tows need to be placed adjacent to, or substantially in contact with, a 0° tow in a same layer, the known lay-up head with associated cutting mechanism may achieve good results. As can be seen in FIG. 2, no major gaps or overlapping are present between courses B of 90° tows and an external 0° tow C of course A.

However, the known lay-up heads and associate cutting mechanism do not achieve satisfactory results when courses of 0° or 90° tows need to be placed together with courses of 45° or 135°, either in two different layers (FIG. 3) or in a single layer (FIGS. 4a and 4b).

In detail, with reference to FIG. 3, a course E of 45° tows is laid on two courses A of 0° tows. Courses A define a first layer and course E define a second layer of the composite structure. Course E features a serrated rim F, which extends beyond a rim H defined by courses A of the first layer and requires to be machined off. This means a waste of material and time.

Further problems may arise with the FIGS. 4a and 4b arrangements, in which a course E of 45° tows is arranged along with a course A of 0° tows in a single layer. 45° tows may be arranged either adjacent to an external 0° tow C of course A (FIG. 4a) leaving a gap G filled of resins, or partially overlapping the same external 0° tow C of course A (FIG. 4b) leading to tow wrinkles as further layers are applied. In either case, the mechanical properties of the composite component may be at risk.

Accordingly, it is desirable to provide an improved cutting mechanism for composite material lay-up equipment.

SUMMARY

According to a first aspect, there is provided a cutting mechanism for a composite material lay-up head comprising a plurality of blades, each blade having a variable width, and a drive mechanism to drive the blades along, and in rotation about, an axial direction to sever a respective tow of composite material, the blades being adapted to rotate about the axial direction between a first angular position, wherein the blades are arranged transversally to a longitudinal direction of the respective tow to sever the respective tow along a first cutting direction transversal to the longitudinal direction, and a second angular position, wherein the blades are arranged rotated by a rotation angle to the first cutting direction to sever the respective tow along a second cutting direction rotated by the rotation angle to the first cutting direction.

In the first angular position, the blades may be arranged perpendicularly to the longitudinal direction of the respective tow.

Adjacent blades, in the first angular position, may partially overlap along the longitudinal direction of the tows. In the first angular position adjacent blades may be in mutual contact.

The blade may achieve a first cut in the first angular position and a second cut, angled to the first cut by the rotation angle, in the second angular position. Being $L_1$ the length of the first cut and $L_2$ the length of the second cut, $L_2$ is greater than $L_1$. $L_1$ may correspond to the width of the tow.

Each blade may include a main portion with a first width to achieve the first cut. The first width of the main portion may be at least the width of the respective tow. Each blade may further include a first and a second lateral portion; the main portion and the first and second lateral portions may have a second width to achieve the second cut. The main portion of the blade may protrude from the first and second lateral portions.

The blades may rotate about respective rotation axes, the second width of the blades being greater than a distance between the rotation axes of two adjacent blades.

The first width of the main portion may be at least the length of the first cut to sever the tow. The second width of the main portion and the first and second lateral portions may be at least the length of the second cut to sever the tow.

Triangle properties may give information on the relation between the first and the second width of the blade depending on the rotation angle. For example, when the first cutting direction is perpendicular to the longitudinal direction of the tow, $L_2$ may be $L_1$ divided by the cosine of the rotation angle, and consequently the second width may be at least the first width divided by the cosine of the rotation angle. In general, when the first cutting direction is not perpendicular to the longitudinal direction of the tow, i.e. the first cutting direction is rotated to the longitudinal direction of the tow by a first cutting angle different from 90°, $L_1$ may be the width of the tow divided by the cosine of the first cutting angle, and $L_2$ may be the width of the tow divided by the cosine of the sum of the rotation angle and the first cutting angle. From the above, being $\alpha$ the rotation angle and $\beta$ the first cutting angle, the following relation applies:

$$L_2 = L_1 \cos(\alpha)/\cos(\alpha+\beta)$$

and consequently the second width of the blade may be at least the first width of the blade times the cosine of the rotation angle and divided by the cosine of the sum of the rotation angle and the first cutting angle.

The blades may feature a variable thickness. At a given cross-section, the first and second lateral portions may feature a first and a second thickness, respectively, and the main portion may feature a maximum thickness equal to the sum of the first and second thickness of the first and second lateral portions.

The main portion, the first lateral portion and the second lateral portion may include a first cutting profile, a second cutting profile and a third cutting profile, respectively. The first cutting profile may be of the guillotine-type. Moreover, the second and the third cutting profile may be of the guillotine-type. The second and third cutting profile may be convergent towards the main portion. The first cutting profile may be parallel to any one of the second and third cutting profile.

In the first angular position adjacent blades may overlap at corresponding lateral portions. In the first angular position adjacent blades may be in mutual contact at corresponding lateral portions. In particular, in the first angular position the first lateral portion of a blade may overlap to the second lateral portion of an adjacent blade. In the first angular position the first lateral portion of a blade may be in contact with the second lateral portion of an adjacent blade. Moreover, in the first angular position the first lateral portion of a blade may and the second lateral portion of an adjacent blade may feature a total thickness equal to the maximum thickness of the main portion.

In the first angular position, the blades may be aligned along the first cutting direction. In particular, in the first angular position, the main portions of the blades may be aligned along the first angular position. Moreover, in the first angular position, the blades may feature a serrated profile, defined by the first cutting profile of the main portions. Alternatively, in the first angular position, the blades may not be aligned along the first cutting direction and adjacent blades may not be in contact. In the second angular position, adjacent blades may not be in contact.

The drive mechanism may be adapted to drive the blades, along the axial direction, for a first stroke to sever the respective tows along the first cutting direction and for a second stroke to sever the respective tows along the second cutting direction. The first stroke may be shorter than the second stroke. The drive mechanism may drive the blades along the axial direction between a first axial position, wherein the blades are distanced from the respective tow, and a second axial position for the first stroke, and between the first axial position and a third axial position for the second stroke. The blades, as they move from the first axial position to the second or third axial position, sever the respective tows.

In the first angular position, the drive mechanism may drive the blades for the first stroke; in the second angular position, the drive mechanism may drive the blades for the second stroke.

Each blade may be connected with a respective rod that bears a gear; the drive mechanism may further include a toothed belt engaged with the gears to rotate the blades between the first and second angular position. The blades may rotate about the respective rods between the first and second angular position. The rods may be arranged along the axial direction.

The drive mechanism may comprise a motor to drive the toothed belt. Alternatively, instead of the toothed belt and relative motor, the drive mechanism may include, for each blade, a motor, to drive in rotation each blade individually. The blades and/or the drive mechanism may include one or more stoppers to stop the blades in the first and second angular position.

The drive mechanism may be adapted to drive each blade individually along the axial direction. Alternatively, the drive mechanism may be adapted to drive all of the blades concurrently along the axial direction.

According to a second aspect, there is provided a lay-up head for a composite material lay-up machine, comprising a cutting mechanism in accordance with the first aspect and a dispensing mechanism for individually dispensing tows of composite material. The lay-up head may further comprise a roller for pressing the tows against an application surface. The lay-up head may be arranged to simultaneously apply a plurality of tows side-by-side.

The lay-up head may be controlled to lay-up a first course of tows along a first dispensing direction and a second course of tows along a second dispensing direction, such that the first dispensing direction may be transversal, but not perpendicular, to the second dispensing directions. Furthermore, the lay-up head may be controlled to sever the tows of the first course along the first cutting direction and the tows of the second course along the second cutting direction, the second cutting direction being parallel to the first dispensing direction.

The lay-up head may be controlled to align a cut profile of the tows of the second course along the second cutting direction. Accordingly, the second course as a whole may feature a cut profile aligned along the second cut direction. The cutting mechanism may be controlled to sever each tow individually and sequentially, such that a cut profile of each tow may be aligned along the second cutting direction. Alternatively, the cutting mechanism may be controlled to sever each tow of the second course concurrently, such that the cut profiles of each tow are mutually parallel and the second course as a whole may feature a serrated cut profile.

According to a third aspect, there is provided a composite material lay-up machine comprising a lay-up head in accordance to the second aspect and a robot carrying the lay-up head. The robot may be a multiple axis robot having a fixed base and a rotatable hub coupled to the base. The robot may be a 2, 3, 4, 5 or 6 axis robot. The robot may comprise a robotic arm coupled to the rotatable hub.

The lay-up machine may further comprise a dispenser, such as a creel cabinet, which may retain one or more reels of composite material. The dispenser may be fixed to the rotatable hub. The lay-up head may be attached to the robotic arm, in particular to an end of the robotic arm.

According to a forth aspect, there is provided a method of manufacturing a composite material article for a gas turbine engine, comprising laying-up tows of composite material and periodically severing said tows to form courses of composite material of predefined length to produce a pre-form; wherein laying-up tows comprises dispensing first tows along a first dispensing direction and severing said first tows along a first cutting direction to form a first course; and dispensing second tows along a second dispensing direction and severing said second tows along a second cutting direction, parallel to the first dispensing direction to form a second course, wherein said first dispensing direction and said second dispensing direction are mutually transversal, but not perpendicular.

Dispensing and severing the second tows may comprise dispensing and severing each second tow individually and sequentially, such that respective second cuts of the second tows are aligned along the second cutting direction. In detail, as a result of individually and sequentially dispensing and severing the second tows, the second tows may be arranged adjacent to the first course in a same layer, minimising a gap there between. Moreover, the second tows may be arranged above the first course, in a different layer, in such a way that the second cuts are aligned along a rim of the first course.

The method according to the forth aspect may further comprise forming the pre-form to a desired shape, and curing the pre-form formed to the desired shape to form the composite material article.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
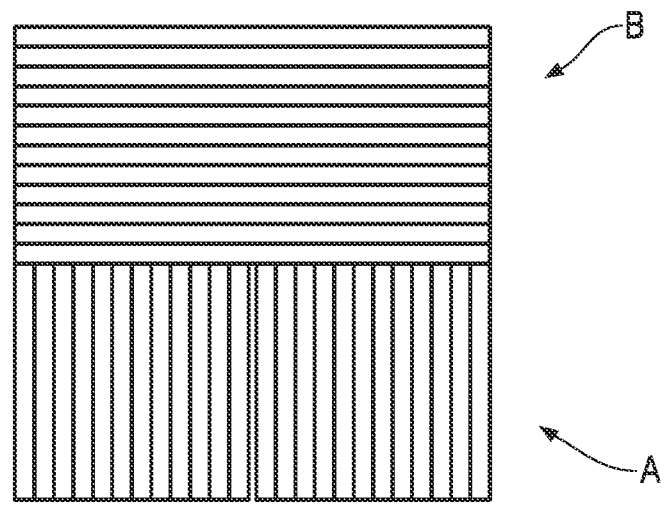
FIGS. 1 and 2 are top views of tow courses mutually perpendicular.
Figure 2:
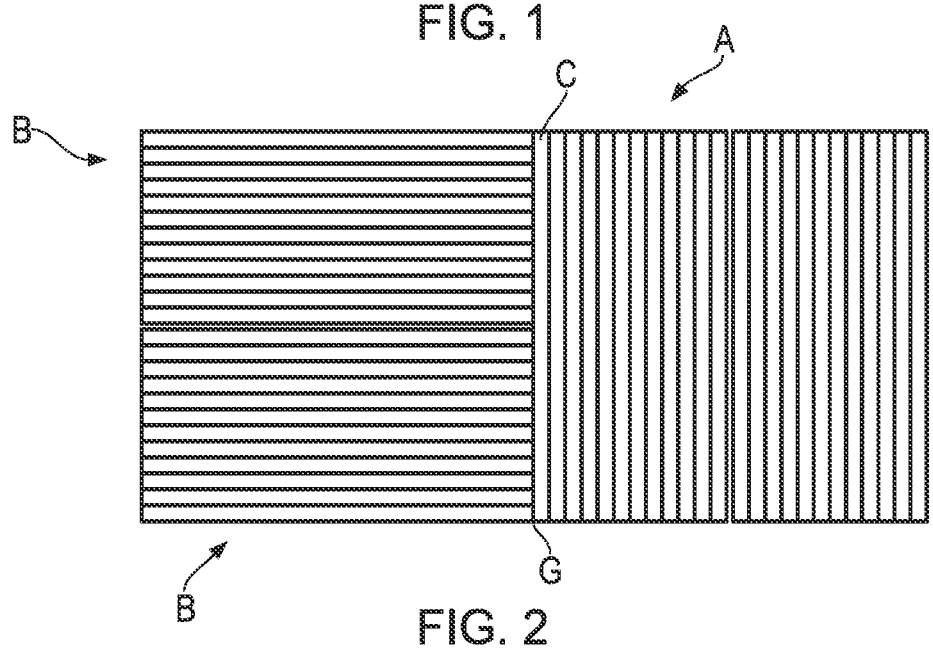
Figure 3:
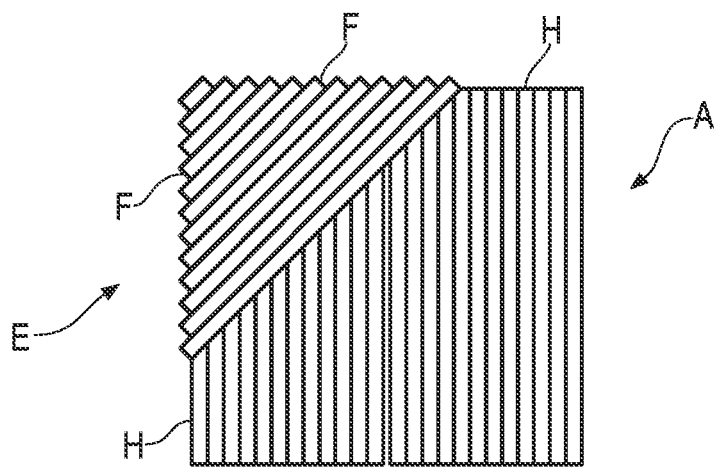
FIGS. 3, 4a and 4b are top views of tow courses mutually arranged at 45° as may be applied by a known automated fibre placement machine.
Figure 4A:
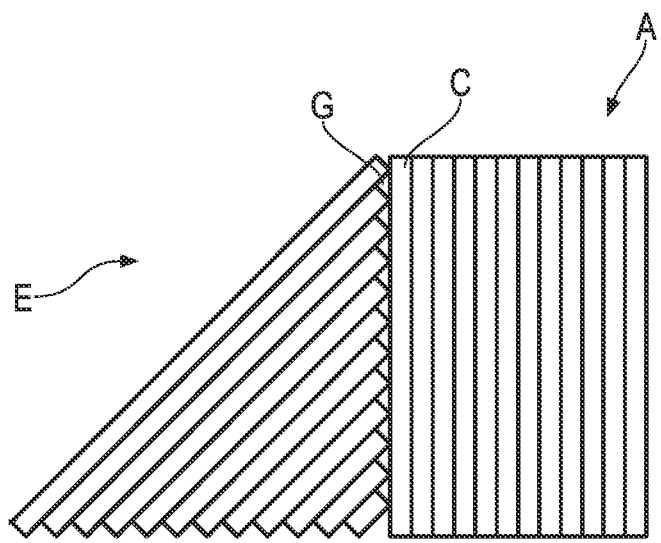
Figure 4B:
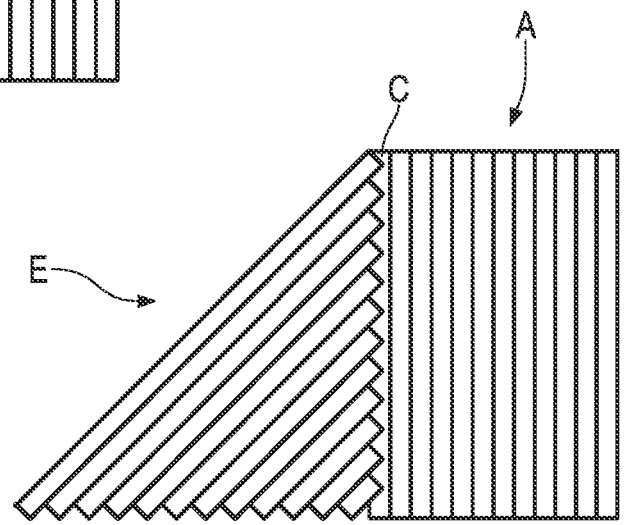

With reference to FIGS. 6-14, there is illustrated a cutting mechanism 1 for a lay-up head 18 comprising a plurality of blades 2 and a drive mechanism 3 to drive the blades 2 along an axial direction $X_A$ to cut a respective tow 14. The blades 2 are aligned transversely to the tows 14.

The blades 2 are rotatable about the axial direction $X_A$ between a first angular position (visible in FIGS. 8 and 9), wherein the blades 2 are arranged perpendicularly to a longitudinal direction $X_L$ of the tow 14 to sever the respective tow 14 along a first cutting direction $X_{C1}$ perpendicular to the longitudinal direction $X_L$, and a second angular position (visible in FIGS. 10 to 12), wherein the blades 2 are arranged rotated by a rotation angle α to the first cutting direction $X_{C1}$ to sever the respective tow 14 along a second cutting direction $X_{C2}$ rotated by the rotation angle α to the first cutting direction $X_{C1}$.

Figure 6:
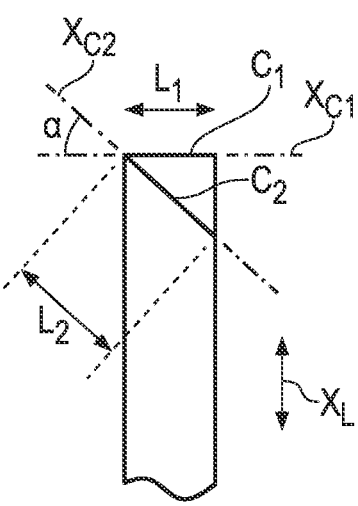
FIG. 6 is a top view of a tow highlighting a first and a second cutting direction as may be achieved by a cutting mechanism according to the first aspect.

FIG. 6 illustrates in detail a tow 14 with a respective longitudinal direction $X_L$, the first cutting direction $X_{C1}$ and the second cutting direction $X_{C2}$ with corresponding rotation angle α. In the illustrated embodiment, the first cutting direction $X_{C1}$ is perpendicular to the longitudinal direction $X_L$ and the rotation angle α is 45°. In other non-illustrated embodiments, the first cutting direction $X_{C1}$ may be transversal, not necessarily perpendicular, to the longitudinal direction $X_L$ and the rotation angle α may be any angle between 0 and 180° (i.e. −90°), for example 15°, 30° 60°, 75°, 105°, 120°, 135°, 150°, or 165°.

In the first angular position, the blade 2 achieves a first cut $C_1$, that is $L_1$ long, as the width of the tow 14. In the second angular position, the blade achieves a second cut $C_2$, that is $L_2$ long. The first cut $C_1$ is angled to the second cut $C_2$ by the rotation angle α. The following relation applies to $L_1$ and $L_2$:

$$L_1 = L_2 \cos(\alpha)$$

Figure 7:
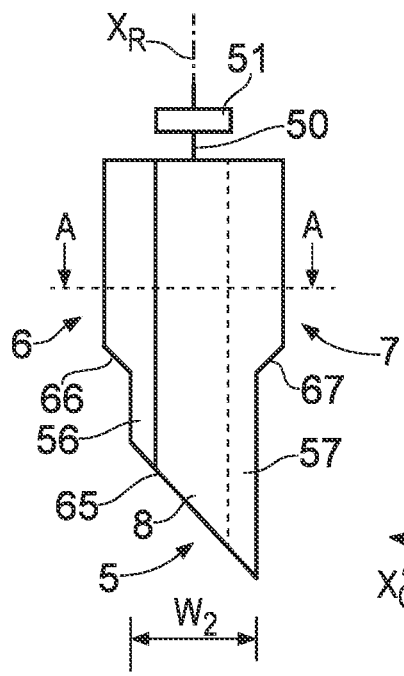
FIG. 7 is a front view of a blade of a cutting mechanism according to the first aspect.
Figure 7A:
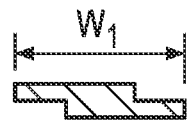
FIG. 7a is a schematic cross-section of the blade of FIG. 7, taken along line A-A.
Figure 8A:
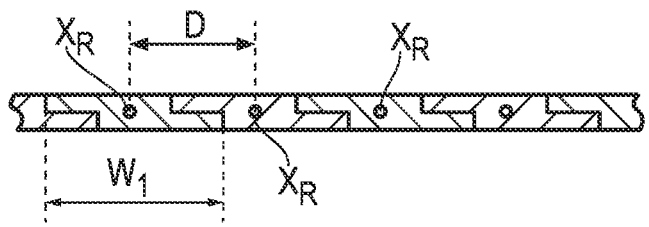
FIG. 8a is an enlarged, schematic cross-section, taken along line B-B of FIG. 8, of a plurality of blades in the first angular position.
Figure 9:
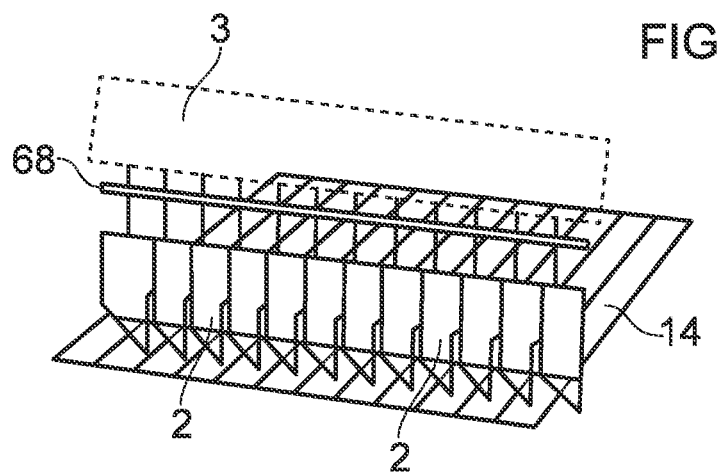
FIG. 9 is an isometric view of the cutting mechanism of FIG. 8 with blades in the first angular position and second operative position.
Figure 10:
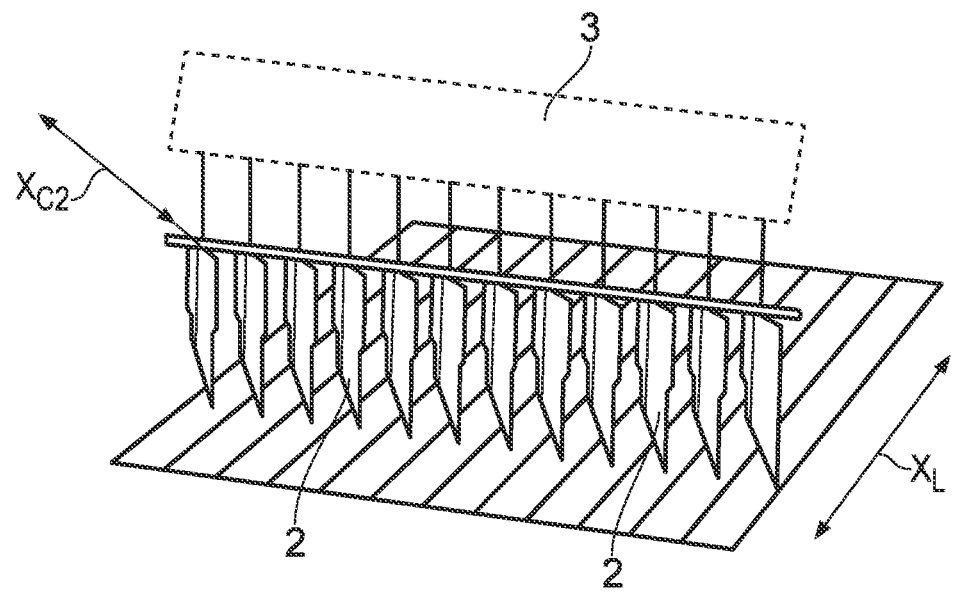
FIG. 10 is an isometric view of the blades of FIG. 9 in a second angular position and first operative position.
Figure 11:
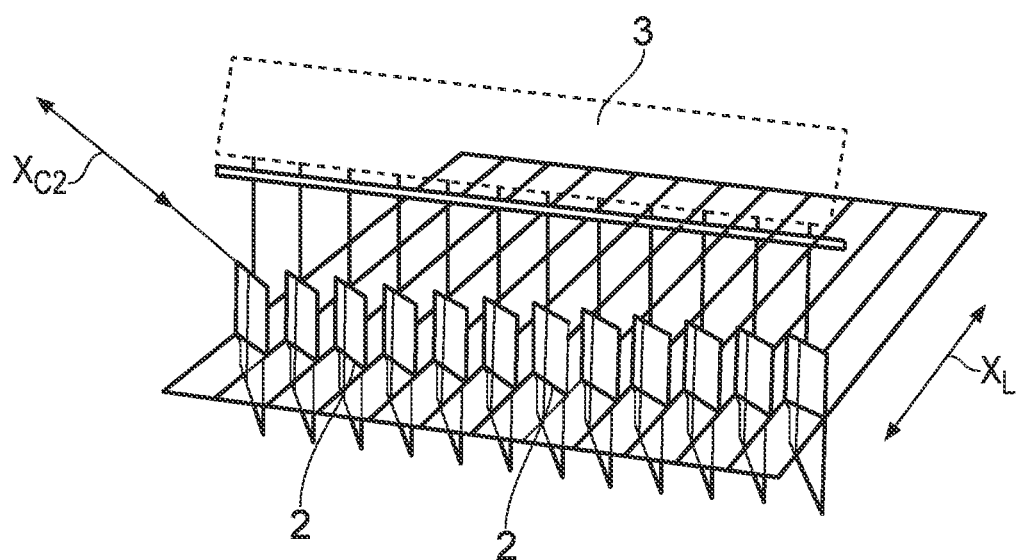
FIG. 11 is an isometric view of the blades of FIG. 10 in the second angular position and third operative position.
Figure 12:
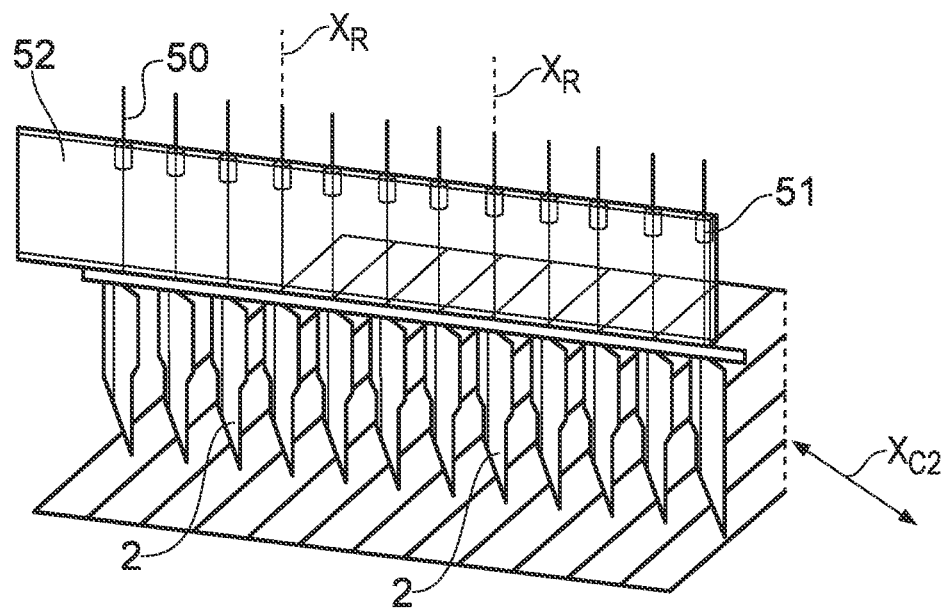
FIG. 12 is an isometric view of a cutting mechanism according to the first aspect and including a drive mechanism according to an embodiment, wherein the blades are in the second angular position and first axial position.
Figure 13:
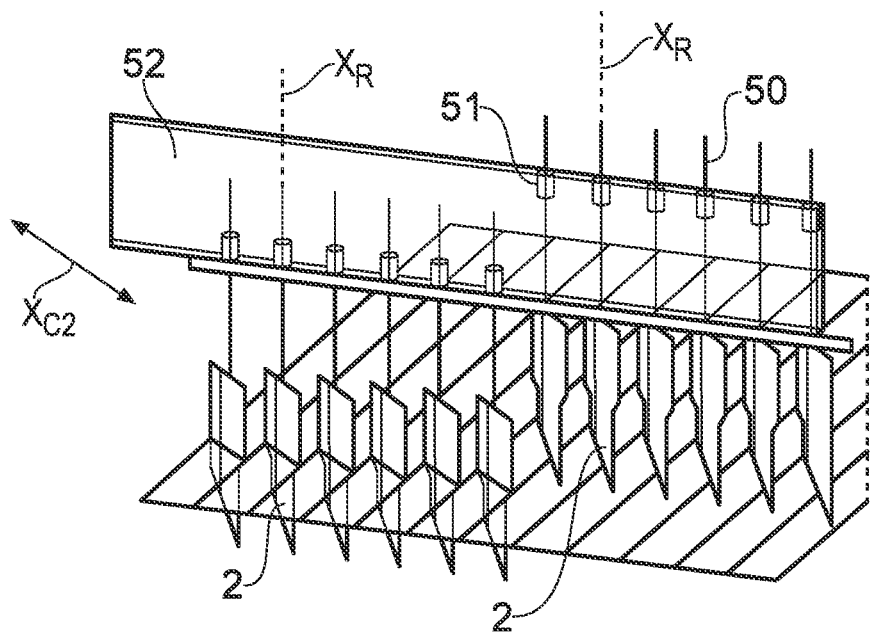
FIG. 13 is an isometric view of the cutting mechanism of FIG. 13, wherein part of the blades are in the first axial position and part of the blades are in the third axial position.

With particular reference to FIGS. 7 and 7a, a blade 2 is illustrated. The blade 2 includes a main portion 5 with a first width $W_1$, a first lateral portion 6 and a second lateral portion 7. The main portion 5 protrudes from the first and second lateral portions 6, 7. The main portion and the first and second lateral portions 6, 7 have a second width $W_2$. To sever the tow 14 along the first or the second cutting direction $X_{C1}$, $X_{C2}$, $W_1$ is greater than or equal to $L_1$, and $W_2$ is greater than or equal to $L_2$.

The blades 2 rotate about respective rotation axes $X_R$. The second width $W_2$ of the blades 2 is greater than a distance D between the rotation axes $X_R$ of two adjacent blades 2.

The blade 2 features a variable thickness. In detail, according to the illustrated embodiment, at a given cross-section, the first lateral portion 6 and second lateral portion 7 feature a first thickness $T_1$ and a second thickness $T_2$, respectively, and the main portion 5 features a maximum thickness $T_M$ equal to the sum of the first and second thickness $T_1$, $T_2$ of the first and second lateral portions 6, 7. The main portion 5 presents variable thickness. In detail, a central part 8 of the main portion 5 features the maximum thickness $T_M$, while a first lateral part 56 and a second lateral part 57 of the main portion 5 feature the first thickness $T_1$ of the first lateral portion 6 and the second thickness $T_2$ of the second lateral portion 7, respectively. In other non-illustrated embodiments, the main portion 5 may present a constant thickness equal to the sum of the first and second thickness $T_1$, $T_2$ of the first and second lateral portions 6, 7.

The main portion 5, the first lateral portion 6 and the second lateral portion 7 include a first cutting profile 65, a second cutting profile 66 and a third cutting profile 67, respectively. The second and third cutting profiles 66, 67 are convergent towards the main portion 5.

The first cutting profile 65 is parallel to the second cutting profile 66. The first cutting profile 65 is perpendicular to the third cutting profile 67. In an alternative not illustrated embodiment, the first cutting profile 65 may be parallel to the third cutting profile 67 and perpendicular to the second cutting profile 66. Alternatively, in other not illustrated embodiments, the first, second and third cutting profiles 65, 66, 67 may have other orientations: for example, the first cutting profile 65 may not be parallel nor perpendicular to any one of the second and third cutting profiles 66, 67.

In the first angular position, adjacent blades 2 partially overlap along the longitudinal direction $X_L$ of the tows 14. In general, in the first angular position, the first lateral portion 6 of a blade 2 and the second lateral portion 7 of an adjacent blade 2 overlap along the longitudinal direction $X_L$. The overlapped first lateral portion 6 of a blade 2 and the second lateral portion 7 of an adjacent blade 2 feature a total thickness equal to the maximum thickness $T_M$ of the main portion 5.

Blades 2 arranged externally in the cutting mechanism and cooperating with one adjacent blade only may have a different, simplified shape than the blade 2 above described. For example, the second or the third cutting profile 66, 67 may be continuous with the first cutting profile 65.

Figure 8:
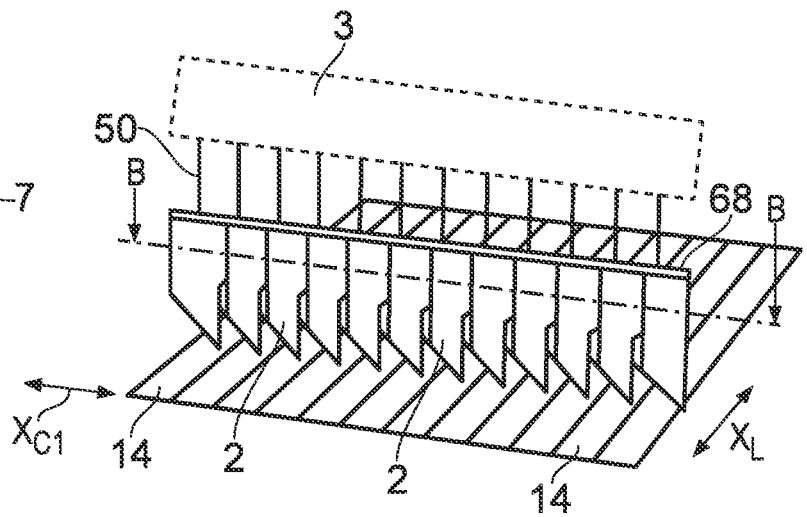
FIG. 8 is an isometric view of a cutting mechanism according to the first aspect with blades in a first angular position and first operative position.

The drive mechanism 3, schematically illustrated with a block in FIGS. 7 and 8, is connected and drives the blades 2 along the axial direction $X_A$, for a first stroke to sever the respective tows 14 along the first cutting direction $X_{C1}$ and for a second stroke to sever the respective tows 14 along the second cutting direction $X_{C2}$. The first stroke may be shorter than the second stroke. Alternatively, the first stroke may be equal to the second stroke. The drive mechanism comprises a guide bar 68, coupled to the rods 50, to guide the blades along the axial direction $X_A$.

The drive mechanism 3 may be adapted to drive each blade 2 individually along the axial direction $X_A$ between a first axial position (see FIGS. 8, 10, and 12), wherein the blades 2 are distanced from the respective tow 14, and a second axial position (see FIG. 9) for the first stroke, and between the first axial position and a third axial position (see FIG. 11) for the second stroke.

To this purpose, the drive mechanism 3 may comprise pneumatic actuated pistons to drive the blades 2 along the axial direction $X_A$. The drive mechanism 3 may comprise resilient members, such as springs, to urge the blades 2 to the first axial position when not driven by the drive mechanism 3.

Figure 14:
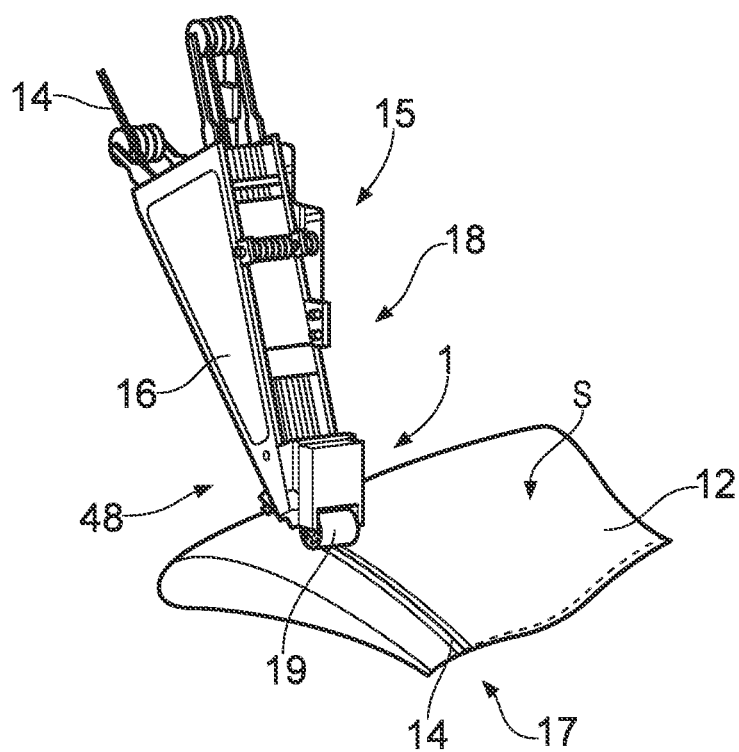
FIG. 14 is an isometric view of a lay-up head applying a course of composite material to an article.

The blades 2 may be individually driven by the drive mechanism 3, such that, as illustrated in FIG. 14, a part of the blades 2 are in the first axial position, while other blades 2 are driven towards the second (or third) axial position.

The blades 2 are connected to a respective rod 50, extending along the axial direction $X_A$. The rod 50 bears a gear 51. In the embodiment illustrated in FIGS. 12 and 13, the drive mechanism 3 comprises a toothed belt 52 that engages the gears 51 of the blades 2. By driving the toothed belt 52, the blades 2 are rotated concurrently in the first or in the second angular position. In not illustrated embodiment, the toothed belt 52 may be replaced by a rack connected to the gears 51, defining a rack-and-pinion system, or by individual motors (one for each blade 2), or by a pneumatic propeller system provided with suitable reference stoppers to stop the blades 2 in the first or second angular position.

FIG. 14 shows in more detail the lay-up head 18 for a composite material lay-up machine 10, comprising a cutting mechanism 1 as above described and a dispensing mechanism 15 for individually dispensing tows 14 of composite material. The lay-up head 18 comprises a support head 16 which carries the dispensing mechanism 15 for dispensing a course 17 of tows 14 of composite material to an article 12, the cutting mechanism 1 for severing lengths of fibre composite material, and a roller 19 located at a tip region 48 for pressing the tows 14 against an application surface S.

The article 12 may be for example an aerospace preform or component such as a blade of a turbomachine, in particular a fan blade, or a fan case. In FIG. 14 the article 12 is a pre-form for a gas turbine engine fan blade being manufactured.

Figure 16:
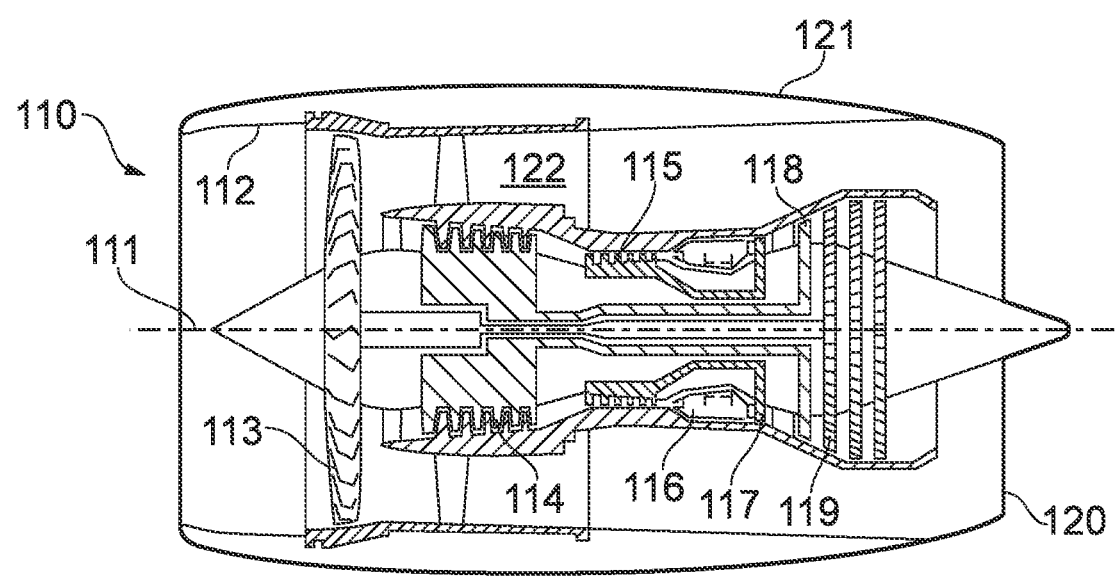
FIG. 16 is a sectional side view of a gas turbine engine.

With reference to FIG. 16, a gas turbine engine is generally indicated at 110, having a principal and rotational axis 111. The engine 110 comprises, in axial flow series, an air intake 112, a propulsive fan 113, an intermediate pressure compressor 114, a high-pressure compressor 115, combustion equipment 116, a high-pressure turbine 117, an intermediate pressure turbine 118, a low-pressure turbine 119 and an exhaust nozzle 120. A nacelle 121 generally surrounds the engine 110 and defines both the intake 112 and the exhaust nozzle 120.

The gas turbine engine 110 works in the conventional manner so that air entering the intake 112 is accelerated by the fan 113 to produce two air flows: a first air flow into the intermediate pressure compressor 114 and a second air flow which passes through a bypass duct 122 to provide propulsive thrust. The intermediate pressure compressor 114 compresses the air flow directed into it before delivering that air to the high pressure compressor 115 where further compression takes place.

The compressed air exhausted from the high-pressure compressor 115 is directed into the combustion equipment 116 where it is mixed with fuel and the mixture combusted. The resultant hot combustion products then expand through, and thereby drive the high, intermediate and low-pressure turbines 117, 118, 119 before being exhausted through the nozzle 120 to provide additional propulsive thrust. The high 117, intermediate 118 and low 119 pressure turbines drive respectively the high pressure compressor 115, intermediate pressure compressor 114 and fan 113, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

In use, the dispensing mechanism 15 dispenses the tows 14 in a generally longitudinally extending dispensing direction that is parallel to the longitudinal axis (i.e. front to rear axis) of the lay-up head 18. The dispensing direction corresponds to the longitudinal direction $X_L$ of the tows 14 being applied.

Figure 5:
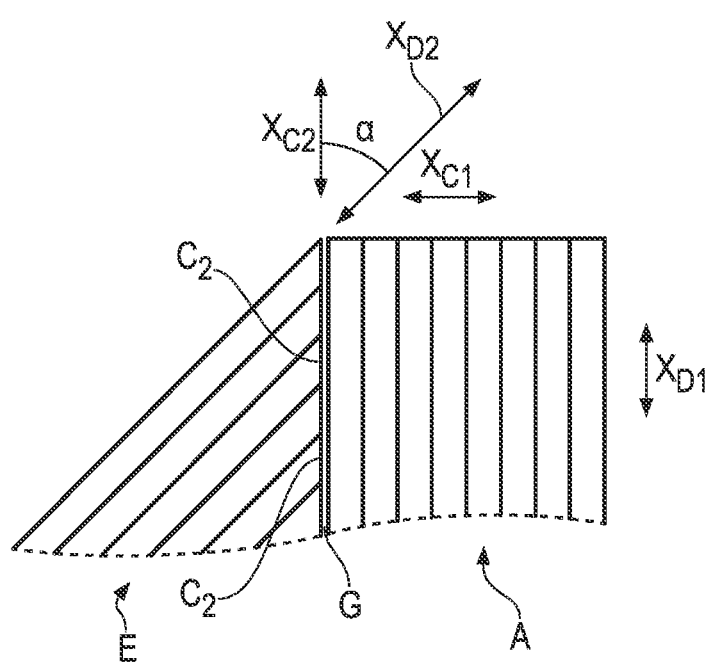
FIG. 5 is a top view of tow courses mutually arranged at 45° as may be applied by a lay-up head including a cutting mechanism according to a first aspect.

The lay-up head 18 is controlled to lay-up courses of tows 14 along mutually different dispensing directions. FIG. 5 shows an exemplary arrangement of tows that can be obtained by the lay-up head 18.

The lay-up head 18 is controlled to lay-up a first course A of tows 14 along a first dispensing direction $X_{D1}$ and a second course E of tows 14 along a second dispensing direction $X_{D2}$, the first applying direction $X_{D1}$ being angled by 45° to the second dispensing directions $X_{D2}$, and to cut the tows 14 of the first course A along the first cutting direction $X_{C1}$ and the tows 14 of the second course E along the second cutting direction $X_{C2}$, which is parallel to the first dispensing direction $X_{D1}$. The lay-up head 18 may be controlled to lay-up the first course A and the second course E along any mutually transversal first and second dispensing direction $X_{D1}$, $X_{D2}$.

The lay-up head 18 and associated cutting mechanism 1 may be further operated to independently and sequentially dispense and sever each tow 14 of a course, such that the second cuts $C_2$ are aligned. In FIG. 5, the tows 14 of the second course E feature a cutting profile aligned along the second cutting direction $X_{C2}$, such that the tows 14 of the second course E may be laid-up adjacent an external tow of the first course A, minimising a gap G therebetween.

Figure 15:
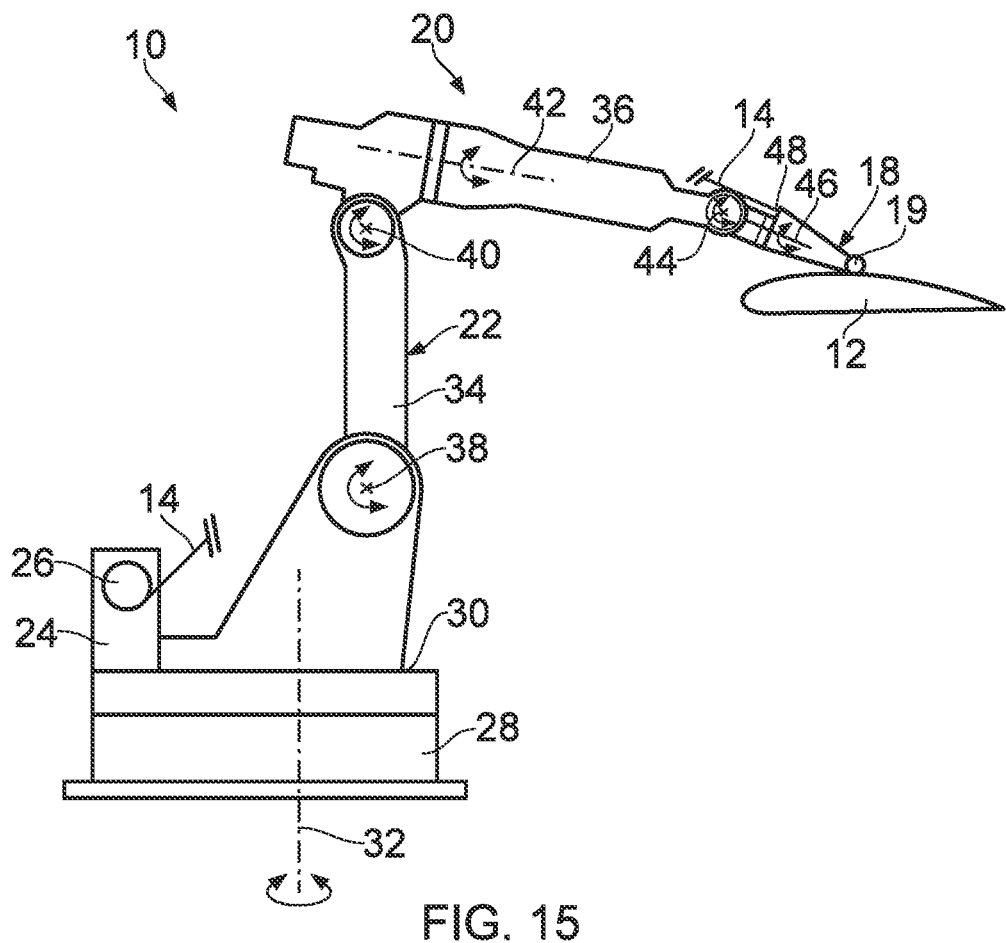
FIG. 15 is a schematic lateral view of a composite material lay-up machine applying a course of composite material to an article.

FIG. 15 shows a composite material lay-up machine 10 and an article 12 to which fibre composite material is applied to form a composite material component, for example the pre-form for a gas turbine engine fan blade of FIG. 14. The machine 10 performs a lay-up process in which a plurality of fibre composite tows 14 are applied side-by-side onto an application surface of the article 12. In this embodiment, the machine 10 comprises a 6-axis robot 20 having a composite material lay-up head 18 attached to an end of a robotic arm 22 (i.e. the lay-up head is the end effector).

The six-axis robot 20 comprises a fixed base 28 and a hub 30 that is rotatably mounted to the base 28 such that the hub 30 can rotate about a vertical axis 32. This vertical axis 32 is commonly referred to as axis 1. The robotic arm 22 of the robot 20 has a lower arm 34 and an upper arm 36. The lower arm 34 is attached to the hub 30 such that it can pivot about a horizontal axis 38 which is commonly referred to as axis 2. The upper arm 36 is attached to the end of the lower arm 34 such that it can pivot about a horizontal axis 40 which is commonly referred to as axis 3. Axes 2 and 3 are parallel to one another. The upper arm 36 is rotatable about an axis 42 that is parallel to the longitudinal axis of the upper arm 36, and this axis is commonly referred to as axis 4. The end effector of the robot 20, which in this case is the lay-up head 18, is provided at the end of the robotic arm 22 and can pivot/rotate about two orthogonal axes 44, 46 which are commonly referred to as axes 5 and 6. Axis 6, indicated as 46, is parallel to a longitudinal axis of the lay-up head 18, and axis 5, indicated as 44, is perpendicular to axis 6.

The machine 10 also comprises a dispenser 24 (sometimes referred to as a creel cabinet) which retains a plurality of reels 26 of tows 14. The dispenser 24 is fixed (or mounted) to the hub 30 of the robot 20 such that it rotates about the vertical axis 32 with the hub 30 and robotic arm 22. The reels 26 may be all driven at a same rotational speed. Moreover, the reels 26 may be driven individually. In other words, each reel 26, if driven, rotates at the rotational speed.

In use, the machine 10 feeds or dispenses a plurality of tows 14 from the dispenser 24 and, by using a robotic controller (not shown), the robot 20 is operated to move the lay-up head 18 relative to the article 12 to apply the tows 14 to the application surface S. In an embodiment the tows 14 are pre-impregnated with matrix material such as epoxy resin, in other embodiments each tow may comprise fibre reinforcement material only (often referred to as "dry fiber") and matrix material may be added subsequently. The tows 14 pass between the article 12 and the roller 19 which presses them against the application surface S. At the end of an appropriate stage of the lay-up process, the tows 14 are cut by the cutting mechanism 1.

The composite material lay-up machine 10 may be operated to carry out a method of manufacturing a composite material article 12 for a gas turbine engine, comprising
 laying-up tows 14 of composite material and periodically severing said tows 14 to form courses 17 of composite material of predefined length to produce a pre-form;
wherein laying-up and severing comprise:
 dispensing first tows 14 along a first dispensing direction $X_{D1}$ and severing said first tows 14 along a first cutting direction $X_{C1}$ to form a first course,
 dispensing second tows 14 along a second dispensing direction $X_{D2}$ and severing said second tows 14 along a second cutting direction $X_{C2}$, parallel to the first dispensing direction $X_{D1}$ to form a second course, wherein said first dispensing direction $X_{D1}$ and said second dispensing direction $X_{D2}$ are mutually transversal, but not perpendicular.

The composite material article may be a blade of a turbomachine.

Severing the second tows 14 may comprise severing each second tow 14 individually and sequentially, such that respective second cuts $C_2$ of the second tows 14 are aligned along the second cutting $X_{C2}$ direction. In other words, the second course 14 may feature a rectilinear cut profile.

The method may further comprise arranging or applying the second tows 14 adjacent to the first course in a same layer, such that the second cuts $C_2$ of the second courses 14 are adjacent to, or in contact with, an external first tow of the first course. The second tows 14 may be arranged adjacent to the first course leaving a minimum gap, or no gap at all.

The method may comprise arranging or applying the second tows 14 above the first tows 14, i.e. in two different layers, in such a way that the second cuts $C_2$ are aligned along a rim of the first course defined by the first tows.

The method may further comprise forming the pre-form to a desired shape, and curing the pre-form formed to the desired shape to form the composite material article 12.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A cutting mechanism for a composite material lay-up head comprising:
   a plurality of blades, each blade having a variable width, and
   a drive mechanism to drive the blades along, and in rotation about, an axial direction to cut a respective tow of composite material,
   the blades being adapted to rotate about the axial direction between a first angular position, wherein the blades are arranged transversally to a longitudinal direction of the respective tow to sever the respective tow along a first cutting direction transversal to the longitudinal direction, and a second angular position, wherein the blades are arranged rotated by a rotation angle to the first cutting direction to sever the respective tow along a second cutting direction rotated by the rotation angle to the first cutting direction,
   wherein adjacent blades, in the first angular position, partially overlap along the longitudinal direction of the tows.

2. The cutting mechanism according to claim 1, wherein the blades achieve a first cut in the first angular position and a second cut, angled to the first cut by the rotation angle, in the second angular position.

3. The cutting mechanism according to claim 1, wherein the blades feature a variable thickness.

4. The cutting mechanism according to claim 1, wherein the drive mechanism is adapted to drive the blades, along the axial direction, for a first stroke to sever the respective tows along the first cutting direction and for a second stroke to sever the respective tows along the second cutting direction, the first stroke being shorter than the second stroke.

5. The cutting mechanism according to claim 1, wherein each blade is connected with a respective rod that bears a gear, the drive mechanism further including a toothed belt engaged with the gears to rotate the blades between the first and second angular positions, or the drive mechanism is adapted to drive each blade individually along the axial direction.

6. The cutting mechanism according to claim 2, wherein each blade includes a main portion, a first lateral portion and a second lateral portion; the main portion having a first width to achieve the first cut, and the first lateral portion and the second lateral portion having a second width to achieve the second cut.

7. The cutting mechanism according to the claim 6, wherein the main portion protrudes from the first and second lateral portions.

8. The cutting mechanism according to claim 6, wherein, at a given cross-section, the first and second lateral portions feature a first and a second thickness, respectively, and the main portion features a maximum thickness equal to the sum of the first and second thickness of the first and second lateral portions.

9. The cutting mechanism according to claim 6, wherein the main portion, the first lateral portion and the second lateral portion include a first cutting profile, a second cutting profile and a third cutting profile, respectively.

10. The cutting mechanism according to claim 6, wherein in the first angular position adjacent blades are in mutual contact at corresponding lateral portions.

11. A cutting mechanism for a composite material lay-up head comprising:
    a plurality of blades, each blade having a variable width, and
    a drive mechanism to drive the blades along, and in rotation about, an axial direction to cut a respective tow of composite material,
    the blades being adapted to rotate about the axial direction between a first angular position, wherein the blades are arranged transversally to a longitudinal direction of the respective tow to sever the respective tow along a first cutting direction transversal to the longitudinal direction, and a second angular position, wherein the blades are arranged rotated by a rotation angle to the first cutting direction to sever the respective tow along a second cutting direction rotated by the rotation angle to the first cutting direction,
    wherein the blades achieve a first cut in the first angular position and a second cut, angled to the first cut by the rotation angle, in the second angular position,
    wherein each blade includes a main portion, a first lateral portion and a second lateral portion; the main portion having a first width to achieve the first cut, and the first lateral portion and the second lateral portion having a second width to achieve the second cut,
    wherein the blades rotate about respective rotation axes, the second width of the blades being greater than a distance between the rotation axes of two adjacent blades.

12. The cutting mechanism according to claim 9, wherein the second and third cutting profiles are convergent towards the main portion, and/or wherein the first cutting profile is parallel to any one of the second and third cutting profiles.

13. A lay-up head for a composite material lay-up machine, comprising:
    a cutting mechanism for a composite material lay-up head comprising:
       a plurality of blades, each blade having a variable width, and
       a drive mechanism to drive the blades along, and in rotation about, an axial direction to cut a respective tow of composite material,
       the blades being adapted to rotate about the axial direction between a first angular position, wherein the blades are arranged transversally to a longitudinal direction of the respective tow to sever the respective tow along a first cutting direction transversal to the longitudinal direction, and a second angular position, wherein the blades are arranged rotated by a rotation angle to the first cutting direction to sever the respective tow along a second cutting direction rotated by the rotation angle to the first cutting direction; and
    a dispensing mechanism for individually dispensing tows of composite material.

14. The lay-up head according to claim 13, wherein the lay-up head is controlled to lay-up a first course of tows along a first dispensing direction and a second course of tows along a second dispensing direction, the first dispensing direction being transversal, but not perpendicular, to the second dispensing directions, and to sever the tows of the first course along the first cutting direction and the tows of the second course along the second cutting direction, said second cutting direction being parallel to the first dispensing direction.

15. The lay-up head according to claim 14, wherein the cutting mechanism and the dispensing mechanism are controlled to align a cut profile of the tows of the second course along the second cutting direction.

16. A composite material lay-up machine, comprising a lay-up head according to claim 13 and a robot carrying the lay-up head.

17. A method of manufacturing a composite material article for a gas turbine engine, comprising
- laying-up tows of composite material and periodically severing said tows to form courses of composite material of predefined length to produce a pre-form, the severing being carried out by a cutting mechanism for a composite material lay-up head, the cutting mechanism including:
  - a plurality of blades, each blade having a variable width, and
  - a drive mechanism to drive the blades along, and in rotation about, an axial direction to cut a respective tow of composite material,
  - the blades being adapted to rotate about the axial direction between a first angular position, wherein the blades are arranged transversally to a longitudinal direction of the respective tow to sever the respective tow along a first cutting direction transversal to the longitudinal direction, and a second angular position, wherein the blades are arranged rotated by a rotation angle to the first cutting direction to sever the respective tow along a second cutting direction rotated by the rotation angle to the first cutting direction,
  - wherein adjacent blades, in the first angular position, partially overlap along the longitudinal direction of the tows,
- wherein said laying-up and severing said tows to form courses comprise:
  - dispensing first tows along a first dispensing direction and severing said first tows along the first cutting direction to form a first course; and
  - dispensing second tows along a second dispensing direction and severing said second tows along the second cutting direction, parallel to the first dispensing direction to form a second course, wherein said first dispensing direction and said second dispensing direction are mutually transversal, but not perpendicular.

18. The method according to claim 17, wherein said dispensing and severing the second tows comprises dispensing and severing each second tow individually and sequentially, such that respective second cuts of the second tows are aligned along the second cutting direction.

19. The method according to claim 18, comprising:
forming the pre-form to a shape, and
curing the pre-form formed to the shape to form the composite material article.

* * * * *